Sept. 20, 1971 C. F. DESCHENE 3,605,511
SELF-CLEANING CENTRIFUGAL CLUTCH
Filed Oct. 24, 1969 2 Sheets-Sheet 1
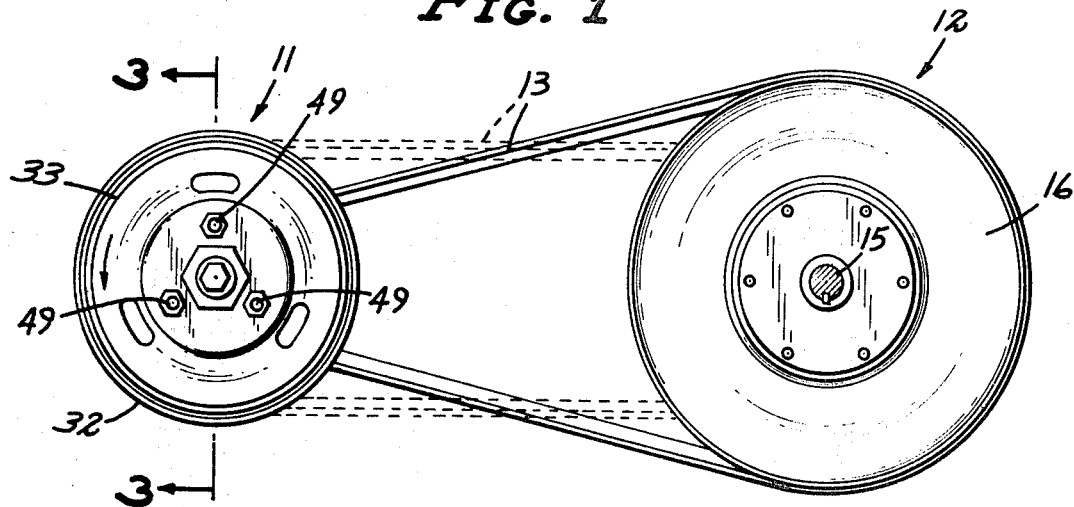
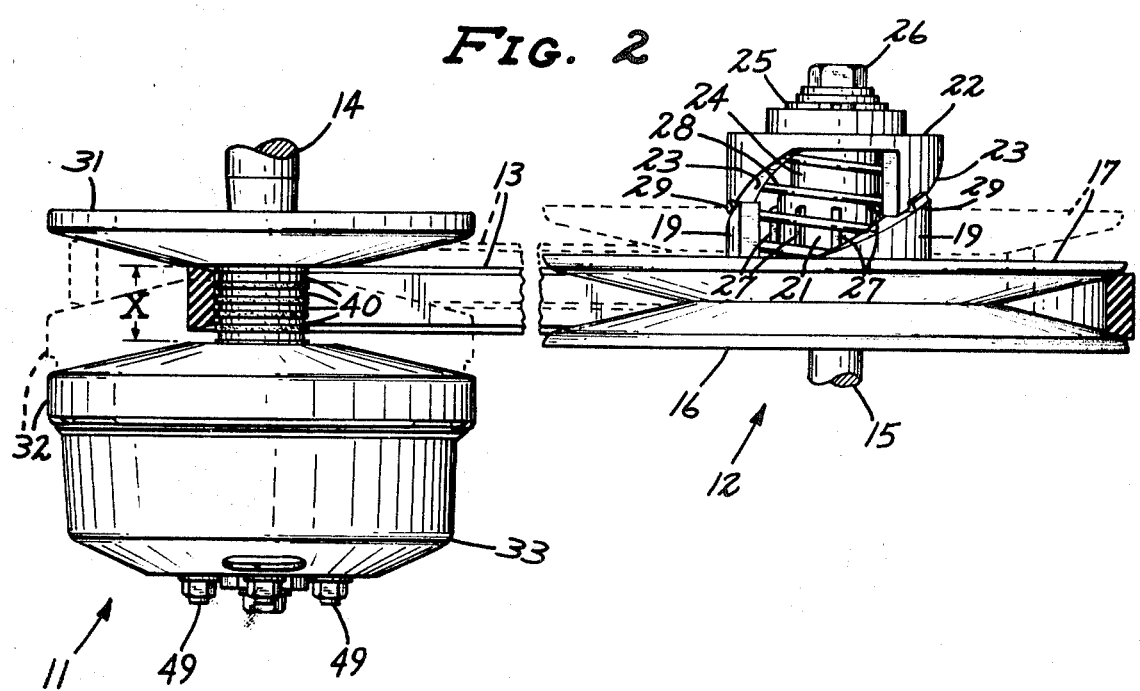
INVENTOR.
CLEMENT F. DESCHENE
BY
Merchant & Gould
ATTORNEYS

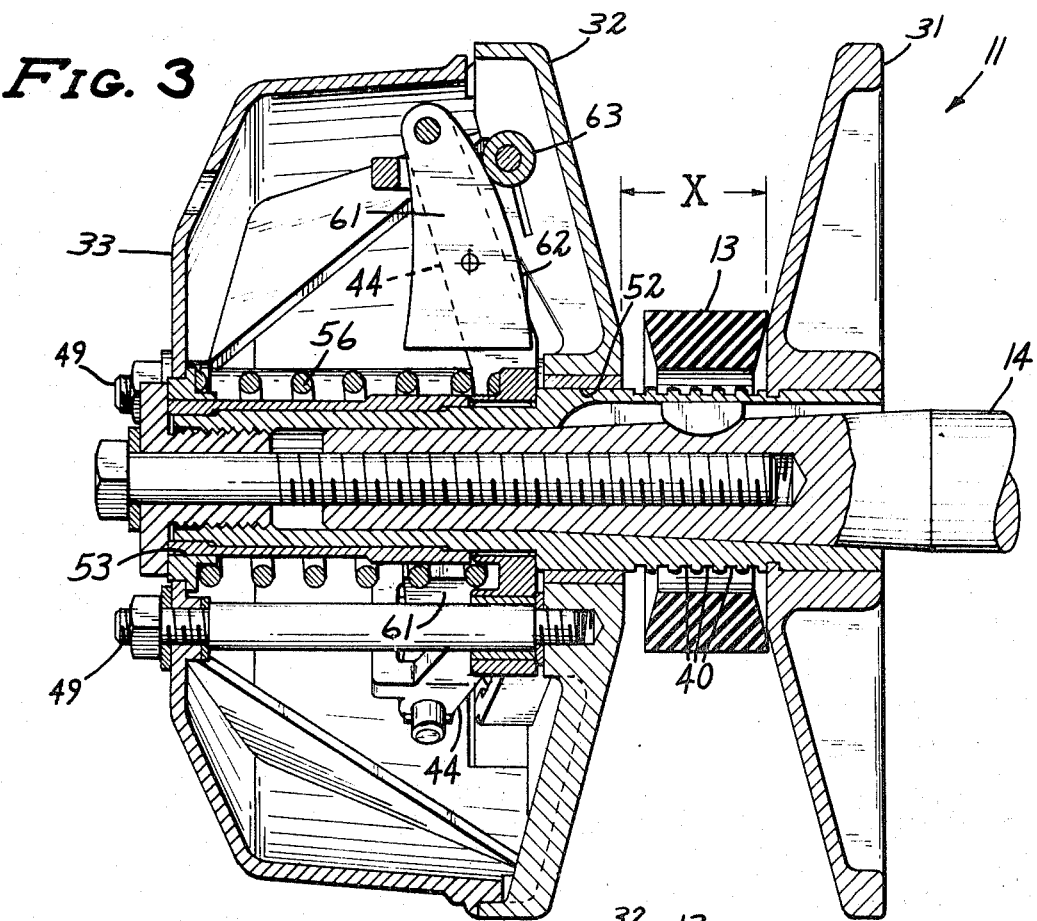
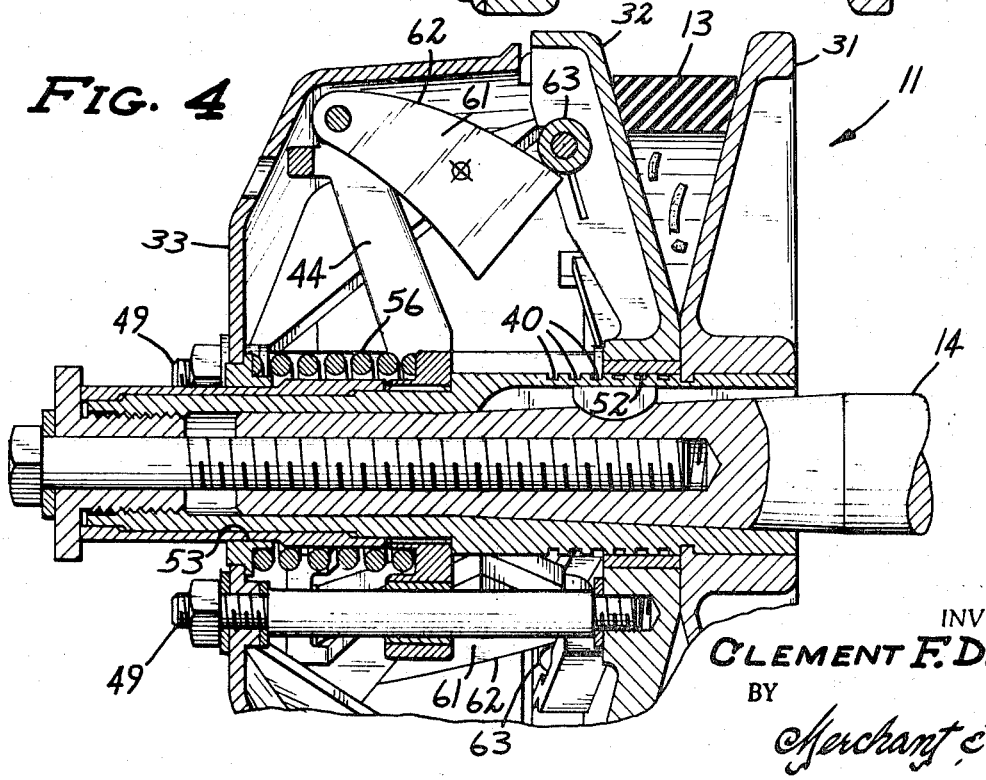

United States Patent Office 3,605,511
Patented Sept. 20, 1971

3,605,511
SELF-CLEANING CENTRIFUGAL CLUTCH
Clement F. Deschene, Roseau, Minn., assignor to
Textron Inc., Providence, R.I.
Filed Oct. 24, 1969, Ser. No. 869,167
Int. Cl. F16h 55/52
U.S. Cl. 74—230.17                         5 Claims

ABSTRACT OF THE DISCLOSURE

A self-cleaning centrifugal clutch is disclosed that consists of driving and driven assemblies operatively connected by an endless rubber belt. The driving assembly includes a pair of sheaves affixed to a rotatable shaft, one of the sheaves being axially movable with respect to the other to control radial position of the belt on the sheaves and thereby effect a variable revolution ratio between the driving and driven assemblies. That portion of the shaft over which the movable sheave rides is formed with a plurality of circumferential grooves which prevent the buildup of burned rubber transferred from the belt to the shaft, thereby keeping the shaft clean and maintaining proper operation.

---

The invention is related generally to centrifugal clutches, and is specifically intended for variable ratio centrifugal clutches consisting of driving and driven assemblies connected by an endless belt.

Centrifugal clutches of this specific type find particular application in conjunction with smaller internal combustion engines where the use of gear transmissions is impractical or too costly. By providing a variable ratio of input to output rotational speed, the clutch serves as both clutch and transmission.

The variable ratio feature is brought about by a pair of rotating sheaves in each of the driving and driven assemblies, each pair including an axially stationary member and an axially movable member. In the driving assembly, the sheaves are normally spaced apart and are movable together in response to increasing rotational speed of the drive shaft. The sheaves of the driven assembly are normally together. Thus, an endless belt joining the two assemblies initially passes through a short circumference about the driving assembly and a large circumference about the driven assembly, but with increasing rotational speed of the drive shaft the belt moves radially outward on the driving assembly and radially inward on the driven assembly.

Throughout the greater portion of the operating range, the sides of the endless belt frictionally engage all of the sheaves and rotate therewith. However, at extremely low revolutions-per-minute (the "neutral" position), the sheaves of the driving assembly remain spaced and the bottom of the stationary belt comes into direct contact with the drive shaft. This generates a great deal of friction which heats the belt and causes melted rubber to transfer to the drive shaft. This ordinarily occurs only a few seconds after the belt contacts the shaft, and with repeated occurrences the melted rubber buildup becomes great enough to hinder movement of the movable sheave on the drive shaft. As more and more resistance is encountered by the movable sheave, performance of the clutch is lessened considerably.

Attempts at solving this problem have generally been directed to reducing friction between the belt and pulley. Prior art devices include drive shafts that are chromed at the point of contact, or ball bearings mounted directly on the shaft. However, these attempts not only do not completely solve the problem, but they add significantly to production costs of the clutch driving assembly.

My invention resides in the formation of a plurality of circumferential grooves in that portion of the drive shaft over which the movable sheave moves. While the grooves present a lesser rotating shaft area to the stationary belt, which predictably results in less rubber being melted and burned off, a more unexpected result has been a definite inability of the rubber to fuse to the shaft. Thus, as the movable sheave moves toward the stationary sheave with increasing shaft speed, rubber deposited on the shaft is shaved off and thrown clear so that the clutch is, in effect, self-cleaning.

Another unexpected result is that less rubber is actually removed from the endless belt than would be expected, even considering the decreased rubbing surface area. This is apparently the result of the drive shaft running cooler with respect to the stationary belt, thereby causing less friction and wear. My invention significantly reduces the belt wearing problem, and the small amount of rubber that is deposited on the drive shaft is removed simply by operation of the clutch. Further, the invention can be applied to clutches at a very small manufacturing cost.

BRIEF DESCRIPTION OF THE DRAWINGS

FIG. 1 is a side elevational view of a variable ratio centrifugal clutch consisting of a driving portion and a driven portion;

FIG. 2 is a top elevational view of the variable ratio centrifugal clutch, portions thereof broken away;

FIG. 3 is a sectional view of the clutch driving portion in one operating position, taken along the line 3—3 of FIG. 1; and FIG. 4 is a view of FIG. 3 taken in another operating position, portions thereof broken away.

DESCRIPTION OF THE PREFERRED EMBODIMENT

In FIG. 1, a variable ratio centrifugal clutch is shown, consisting of a driving assembly 11 and a driven assembly 12 interconnected by an endless belt 13. Referring additionally to FIG. 2, driving assembly 11 is shown to be mounted on an output drive shaft 14 of a power plant (not shown), while driven assembly 12 is mounted on an output shaft 15 adapted for connection with a utilization device (not shown). Driven assembly 12 consists of a stationary sheave 16 and a sheave 17 that is axially movable on shaft 15 as discussed below.

Forming part of sheave 17 are three ramp sections 19 (only two of which can be seen in FIG. 2) and a hub 21. A ramp member 22 includes three ramp surfaces 23 corresponding to ramp sections 19, and a central portion 24 which is suitably secured to shaft 15 such as by a slot and key or splining. A spring 28 is disposed in compression between sheave 17 and member 22, and the entire assembly is held in place by a split lock ring 25 and bolt 26 which threads into shaft 15. Hub 21 has a plurality of spacers 27 which keep spring 28 in proper alignment.

As assembled, sheave 17 is normally urged toward stationary sheave 16 by spring 28, but by application of a proper force spring 28 can be overcome so that sheave 17 moves both rotationally and axially by virtue of ramp sections 19 engaging ramp surfaces 23. In order to prevent excess wear therebetween, ramp surfaces 23 are provided with pads 29 which also provide a desired frictional relation between the two.

Driving assembly 11 also has a stationary sheave 31 fixed on shaft 14 and a movable sheave 32 (see also FIG. 4) that forms part of a movable housing 33. Housing 33 is normally urged away from sheave 31, but in response to an increasing angular velocity of shaft 14 moves a predetermined distance indicated by X defined generally by the space between sheaves 16, 17 axially forward as shown by the dotted lines in FIG. 2. Belt 13 normally occupies a slack position against shaft 14 when driving assembly 11 revolves slowly, but as housing 33 progresses axially it is forced radially outward, also as represented by dotted lines.

With the movement of belt 13 radially outward on driving assembly 11, movable sheave 17 of driven assembly 12 also begins to move away from sheave 16 against the bias of spring 28. However, before this can occur the coefficient of static friction existing between pads 29 and ramp sections 19 must be overcome. Rotation of both assemblies 11 and 12 is in the counterclockwise direction as seen in FIG. 1, so that when the static friction of pads 29 and the biasing force of spring 28 are overcome sheave 17 moves clockwise against belt movement, and the gripping force between belt 13 and sheaves 16 and 17 therefore remains great. Thus, by increasing angular velocity of shaft 14, housing 33 approaches stationary sheave 31 to move belt 13 radially inward with respect to driving assembly 12, resulting in rotational movement of output shaft 15.

Since the radial position of belt 13 with respect to sheaves 31 and 32 of driving assembly 11 and sheaves 16, 17 of driven assembly 12 varies as a function of the angular velocity of shaft 14, it follows that the ratio of revolutions of the shaft 14 to revolutions of the shaft 15 also varies as a function of shaft 14 speed.

At low r.p.m.'s, this ratio is infinite since shaft 14 revolves but belt 13, in its slack position, is unable to transmit rotational energy to driven assembly 12, and output shaft 15 cannot revolve. It is at this point that belt burning occurs due to the friction developed between belt 13 and shaft 14. To eliminatae the problem, that portion of shaft 14 indicated by X over which sheave 32 moves is formed with a plurality of circumferential grooves 40. Preferably, each of the grooves 40 is distinct and disposed perpendicularly to the longitudinal axis of shaft 14. Thus, at a specific position on shaft 14 several sections of belt 13 do not come into engagement with shaft 14. Grooves 40 do not have to be of great depth to effect the result as stated above.

With increasing r.p.m.'s by shaft 14, the belt engages the respective sheaves, and the ratio decreases since the radial distance of belt 13 from shaft 14 increases while its distance from that of shaft 15 is decreasing. By virtue of its variable ratio feature, the centrifugal clutch performs the function of both clutch and transmission.

The specific structure effecting axial movement of sheave 32 on shaft 14 forms no part of the invention. However, such structure is shown in FIGS. 3 and 4 and generally includes a movable housing formed from housing 33, sheave 32 and a plurality of studs 49 that bring members 32 and 33 together in tight, sealed relation. Bearing surfaces 52 and 53 form part of the housing and permit low friction rotation on shaft 14. Bearing 52 slides over the top of grooves 40 as shown.

Splined to shaft 14 is a spider 44 which includes three radially extending arms (only one of which is shown). Pivotally connected to each of the arms is a flyweight 61 which is arranged to swing outwardly and upwardly in response to increasing rotational speed of shaft 14. Each of the flyweights 61 is formed with a cam surface 62 which engages a roller 63 mounted on the inner side of sheave 32. A spring 56 is disposed between spider 44 and housing 33 to normally bias sheave 32 away from sheave 31.

With shaft 14 at rest, flyweights 61 occupy the position as shown in FIG. 3. As shaft 14 begins to rotate and by increasing rotational speed thereof, flyweights 61 swing upwardly and outwardly to move the enclosure (sheave 32, housing 33 and studs 49) axially to the right by virtue of the engagement between cam surfaces 62 and rollers 63, as seen in FIG. 4. During such movement the leading edge of bearing surface 52 shears or shaves rubber deposited on shaft 14 by belt 13 between grooves 40 and same is removed through centrifugal force from the area between sheaves 31, 32. By providing the open grooves 40 rubber on shaft 14 is more easily removed than would be the case were the rubber to extend the full length of distance X. Failure to remove such rubber would obviously cause sheave 32 to bind or stick thus rendering driving clutch 11 inoperative.

What is claimed is:
1. A self-cleaning variable ratio centrifugal clutch comprising:
   a driving assembly;
   a driven assembly;
   an endless belt operatively connecting the driving and driven assemblies;
   the driving assembly comprising:
      a rotatable shaft;
      first and second sheaves mounted on the shaft and arranged for relative axial movement thereon, the endless belt being disposed between said sheaves for frictional engagement thereby and engageable with the rotating shaft with the sheaves spaced apart, said belt and shaft engagement being capable of causing frictional wear of said belt with a resulting deposit of undesirable material on the shaft;
      the rotatable shaft being circumferentially grooved over the length engageable by the endless belt, the relative axial movement of said first and second sheaves being over the top of said grooves;
      and means rotatable with the shaft for effecting said relative axial movement in response to a change in rotational speed of the shaft.

2. A variable diameter pulley adapted for use with a driven belt, comprising:
   a rotatable shaft;
   a first sheave mounted on the shaft and axially stationary thereon;
   a second sheave mounted on the shaft and axially movable over a predetermined length thereof relative to the first sheave to effect changes in the pulley diameter, the relative axial movement between said first and second sheaves being great enough to permit engagement of the drive belt with the rotatable shaft, said engagement being capable of causing frictional wear of the belt with a resulting deposit of undesirable material on the shaft;
   at least a portion of said predetermined length being circumferentially grooved to effect the self-cleaning thereof;
   the second sheave being constructed and arranged to move axially on the shaft over the top of said grooves.

3. The pulley as defined by claim 2, wherein a plurality of separate grooves are formed in said predetermined length, the separate grooves being disposed perpendicularly to the longitudinal axis of the rotatable shaft.

4. The assembly as defined by claim 1, wherein a plurality of separate grooves are formed in said predetermined length.

5. The assembly as defined by claim 4, wherein the separate circumferential grooves are disposed perpendicularly to the longitudinal axis of the rotatable shaft.

References Cited
UNITED STATES PATENTS

| | | | |
|---|---|---|---|
| 3,006,221 | 10/1961 | Cromwell | 74—230.17 |
| 3,066,546 | 12/1962 | Thostenson | 74—230.17 |
| 3,280,648 | 10/1966 | Nelson | 74—230.17 |
| 2,260,797 | 10/1941 | Burns | 74—230.17 |

C. J. HUSAR, Primary Examiner